(12) United States Patent
Cloutier et al.

(10) Patent No.: US 9,888,812 B2
(45) Date of Patent: Feb. 13, 2018

(54) COOKING DEVICE

(71) Applicant: Magellan Home-Goods Ltd., Blaine, WA (US)

(72) Inventors: Andre Dean Cloutier, Blaine, WA (US); Debra Lynne Sasken-Duff, Blaine, WA (US)

(73) Assignee: Magellan Home-Goods, Ltd., Blaine, WA (US)

( * ) Notice: Subject to any disclaimer, the term of this patent is extended or adjusted under 35 U.S.C. 154(b) by 0 days.

(21) Appl. No.: 15/702,565

(22) Filed: Sep. 12, 2017

(65) Prior Publication Data

US 2018/0000290 A1    Jan. 4, 2018

Related U.S. Application Data

(63) Continuation of application No. 14/729,668, filed on Jun. 3, 2015, now Pat. No. 9,756,982.

(51) Int. Cl.
*A47J 43/00* (2006.01)
*A47J 43/044* (2006.01)

(52) U.S. Cl.
CPC .... *A47J 43/044* (2013.01); *A47J 2043/04454* (2013.01)

(58) Field of Classification Search
CPC .............. A47J 43/044; A47J 2043/04454
See application file for complete search history.

(56) References Cited

U.S. PATENT DOCUMENTS

| | | |
|---|---|---|
| 912,136 A | 2/1909 | Landry |
| 1,032,212 A | 7/1912 | Hilton |
| 1,344,836 A | 6/1920 | Walden |
| 1,444,244 A | 2/1923 | Grossenbacher |
| 1,475,081 A | 11/1923 | Parks |
| 1,517,624 A | 12/1924 | Girard et al. |
| 1,617,643 A | 2/1927 | Kriete |
| 1,620,765 A | 3/1927 | Jackson |
| 2,441,941 A | 5/1948 | Shafter |
| 2,505,966 A | 5/1950 | Humphrey |
| 2,505,967 A | 5/1950 | Humphrey |
| 2,561,203 A | 7/1951 | Morris |
| 4,125,065 A * | 11/1978 | Lee .................. A47J 36/08 366/244 |

(Continued)

FOREIGN PATENT DOCUMENTS

JP    1531161 S    8/2015

OTHER PUBLICATIONS

Stirmate, "Stirs for You!", predates Jun. 3, 2015, 1 page.

*Primary Examiner* — Tony G Soohoo
*Assistant Examiner* — Anshu Bhatia
(74) *Attorney, Agent, or Firm* — Schacht Law Office, Inc.; Dwayne Rogge

(57) ABSTRACT

Disclosed herein is a cooking device which may be used for the mixing and stirring of sauces, soups, gravies, and other foodstuffs while being heated on a heat source such as a stovetop, gas burner, hot plate, barbeque grill, charcoal, open flame, etc. The term "sauce" will be used herein to indicate all such foodstuffs to be cooked in order to abbreviate this disclosure. The cooking device allows a user (cook) to stir and mix the sauce while heating the sauce and optionally while a lid assembly is in place thus, more efficiently retaining heat, steam, and flavors within the cooking device during cooking and stirring.

19 Claims, 5 Drawing Sheets

(56) References Cited

U.S. PATENT DOCUMENTS

| | | | |
|---|---|---|---|
| 4,202,256 A | | 5/1980 | Brooks |
| 4,763,567 A | | 8/1988 | Dalquist et al. |
| 5,163,357 A | | 11/1992 | Felknor et al. |
| 5,516,208 A | * | 5/1996 | Givant .................. A47J 36/165 366/251 |
| 5,816,136 A | * | 10/1998 | Stallings ............... A47J 36/165 366/251 |
| 7,744,026 B2 | | 6/2010 | Gregory et al. |
| D636,215 S | | 4/2011 | Cloutier et al. |
| 8,434,403 B1 | | 5/2013 | Cloutier et al. |
| 9,756,982 B2 | | 9/2017 | Cloutier et al. |
| 2004/0194633 A1 | | 10/2004 | Bourne |

* cited by examiner

COOKING DEVICE

RELATED APPLICATIONS

This application claims priority benefit of U.S. Ser. No. 14/729,668 filed Jun. 3, 2015, incorporated herein by reference.

BACKGROUND OF THE DISCLOSURE

Field of the Disclosure

This disclosure relates to the field of cooking pots having a mixing or stirring component to be used while cooking.

SUMMARY OF THE DISCLOSURE

Disclosed herein is a cooking device which in one example comprises: a container having a base with an interior surface, at least one sidewall, and a container rim at the upper vertical edge of the sidewall. In one example, the base is a thermally conductive composition, and has a base, at least one sidewall, and an inner surface. A mixer assembly is also disclosed comprising in one example: a frame assembly removably attached to the container, a lid assembly removably attached to the container, and a crank assembly. The frame comprises a frame rim attached to the container and a radially central frame hub. Also disclosed is a shaft extending from a radial center of the frame rim, through the frame hub downward toward the base of the container, the shaft having a vertical axis of rotation. A scraper paddle extends from the shaft in a first horizontal direction so as to rotate therewith, the scraper paddle at an angle of less than 90° to the interior surface of the base wherein the scraper paddle is in constant contact with the interior surface of the base of the container from the axis of rotation of the shaft to the sidewall of the container. Also disclosed is a mixer paddle which extends from the shaft in a second direction and configured to rotate there with. The mixer paddle lies in a horizontal plane above the scraper paddle at an angle of less than 90° to the interior surface of the base. As shown, the lid assembly substantially extends over the container rim enclosing the container; and the crank assembly is removably attached to the shaft and extends vertically above the lid assembly.

The cooking device may be arranged wherein the frame removably attaches to the container rim.

The cooking device may be arranged wherein the lid assembly removably attaches to the frame rim.

The cooking device may be arranged wherein the scraper paddle comprises a rigid core and a malleable coating.

The cooking device may be arranged wherein the malleable coating comprises heat resistant silicone.

The cooking device may be arranged wherein the rigid core comprises metal.

The cooking device may be arranged wherein the mixer paddle comprises a rigid core and a malleable coating. In one example, the malleable coating comprises heat resistant silicone. In one example the rigid core comprises metal.

The cooking device may be arranged wherein the crank assembly comprises a horizontal leg extending horizontally from the axis of rotation of the shaft to provide leverage, and a knob rotatably attached to the horizontal leg. In one example, the crank assembly is coupled to the lid assembly to be removed therewith. The lid may comprise surfaces defining a plurality of vent holes through the lid. Each vent hole may comprise a vent ring attached to the lid surrounding and reinforcing each vent hole.

The cooking device may be arranged wherein the lid comprises: a lifting knob attached to the lid wherein the lifting knob having a surface defining a void there through aligned with the axis of rotation of the shaft; and the crank assembly removably attaches to the shaft at the lifting knob.

The cooking device may be arranged wherein the scraper paddle has a lower edge radially aligned with the shaft, wherein the lower edge extends radially outward toward the inner surface of the sidewall.

The cooking device may be arranged wherein the mixer paddle has a lower edge radially aligned with the shaft, wherein the lower edge extends radially outward toward the inner surface of the sidewall.

DESCRIPTION OF THE PREFERRED EMBODIMENTS

Disclosed herein is a cooking device 20 which in one example is used for the mixing for stirring of sauces, soups, gravies, and other foodstuffs. the cooking device may be operated while being heated on a heat source 22 (FIG. 2) such as a stovetop, gas burner, hot plate, barbeque grill, charcoal, open flame, etc. the term "sauce" will be used herein to indicate all such foodstuffs to be cooked in order to abbreviate this disclosure and the term "pot" used to indicate the container in which sauce is mixed and cooked. The cooking device allows a user (cook) to stir and mix the sauce while heating the sauce and optionally while a lid assembly 24 is in place thus, more efficiently retaining heat, steam, and flavors within the cooking device 20 during cooking and stirring. In addition, it is commonly desired to scrape the bottom of the cooking device 20 during mixing to avoid scorching. One example of the disclosed apparatus provides such structure.

Figure 1:
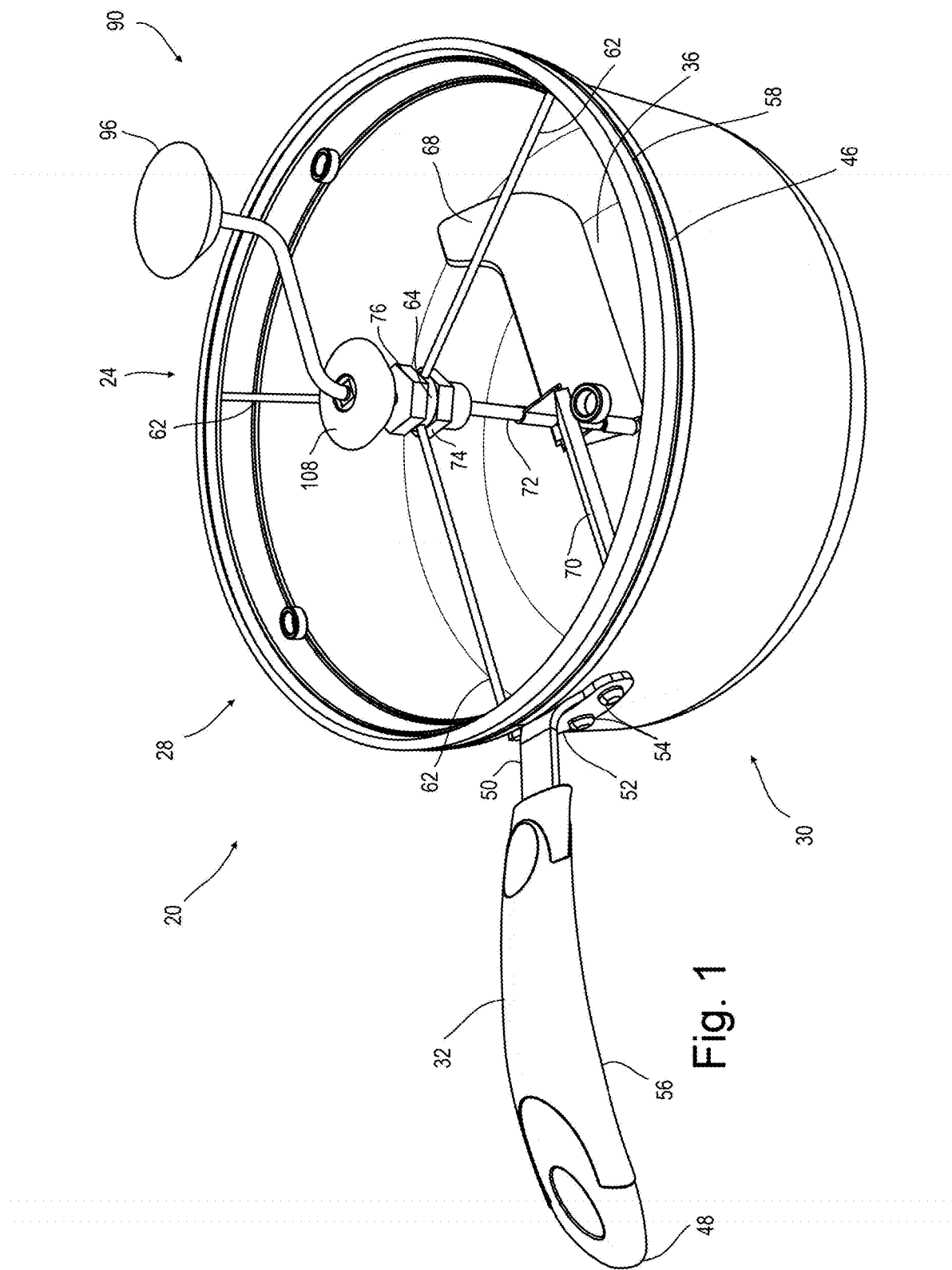
FIG. 1 is a top isometric view of one example of the disclosed cooking device.

Looking to FIG. 1 is shown the cooking device 20 with the lid assembly 24 resting upon the rim of the container. The lid assembly 24 is shown substantially transparent, which allows the user to see the action of the paddles and to see the color and texture of the sauce which is a commonly desired feature. In addition, a frame assembly 26 is shown with the lid assembly 24 attached thereto or resting there upon. In this example, the mixer assembly 28 is attached to the frame assembly 26 and configured to rotate relative thereto. One advantage of this example of the frame assembly 26 being separable from the lid assembly 24 is that the mixing assembly 28 is operable with or without the lid assembly 24 in place. Portions of the mixer assembly 28 rotates within a container 30 which is shown as a cooking pot having a handle 32 extending therefrom to allow a user to grasp the handle 32 during mixing to stabilize the apparatus and also allow the cooking device 20 to be easily repositioned on the cooking surface or to be lifted to and from the cooking surface from prep or serving areas. In one example the cooking device has a volume of 4 quarts, and in another example the cooking device has a volume of 6 quarts although other volumes are conceived.

In more detail, the container 30 in the example shown comprises a base 34 having in one example a substantially planar and horizontal inner surface 36, and an outer surface 38. A sidewall 40 or plurality of sidewalls 40, extend vertically upward from the base 34 to the container rim. The sidewall 40 has an inner surface 42 and outer surface 44. The upper edge of the sidewall 40 terminates at the container rim 46.

Generally, the container 30 will be made of metal such as stainless steel, copper, aluminum, titanium, or alloys thereof. The container 30 may also be made of ceramics such as porcelain, clay, or glass. The container 30 of this example includes a handle 32 with a distal end 48 and a proximal end 50. The proximal end 50 of the handle 32 in this example including an attachment plate 52 which is attached by way of fasteners 54 to the outer surface 44 of the sidewall 40. In addition, the portion of the handle 32 which is commonly grasped by a user may be coated with a thermally insulating coating 56 such as silicone, rubber, wood, etc.

Figure 9:
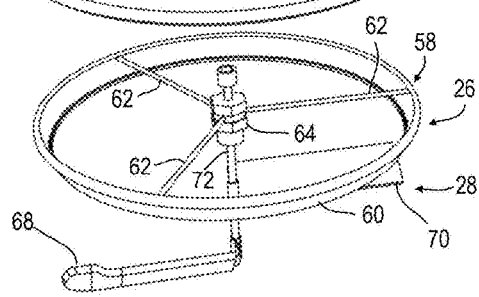
FIG. 9 is a disassembled view of the example shown in FIG. 8 with greater separation between the components.

The frame assembly 26 is more easily seen in FIG. 9 and generally includes a frame rim 58 which may include a radially inward downward protrusion 60. The frame rim 58 of this example rests upon and nests within the container rim 46, while the downward protrusion 60 centers and maintains the frame assembly in contact with the container rim 46 or the inner surface 42 of the sidewall 40. In one form, a malleable gasket or layer such as rubber or silicone may be provided between these two rims 58/46 to hold the frame assembly 26 in position relative to the container 30 during operation. Although rotation of the frame assembly 26 relative to the container 30 will not be substantially detrimental to operation, it may be perceived as detrimental to the user. The frame assembly 26 of this example further comprises a plurality of radial struts 62 extending radially inward between the frame rim 58 and a hub 64 having a surface defining a void 66 there through. The use of the hub 64 to be defined below.

Returning to FIG. 1, the mixer assembly 28 is shown attached to the frame assembly 26. In one example, the mixer assembly 28 includes a single scraper paddle 68 and a single mixer paddle 70 each attached to a mixer shaft 72 having a vertical axis of rotation. In other examples, multiple scraper paddles 68 and mixer paddles 70 may be used. As can be better seen in the hidden line view of FIG. 8, the mixer shaft 72 of this example extends upwards through the void 66 in the frame hub 64. The mixer shaft 72 may be held in place by way of a nut 74 fixed to the shaft 72 below the frame hub 64 and a second nut 76 fixed to the shaft above the frame hub 64. This arrangement allows the shaft 72 with attached paddles 68 and 70 to rotate relative to the container 30, and frame assembly 26 with the lid assembly in position on the container rim or removed from the container. A bearing 78, sleeve, or lubricant may be provided to reduce friction between the mixer shaft 72 and the hub 64. In one form, the nut 74 and/or nut 76 are threaded onto the shaft by way of threads 80. Looking to FIG. 9 it can be seen that in this example, the upper end 82 of the shaft 72 includes a crank receiver 84. In this example, the crank receiver 84 has a non-cylindrical inner surface 86 which receives and is attached to a non-cylindrical outer surface 88 of a crank assembly 90, thus providing rotating force to the mixer assembly 28. In the example shown, the crank assembly 90 includes the protrusion surface 88, a horizontal leg 92 extending radially outward from the protrusion surface 88 to a vertical leg 94, and a crank knob 96 attached to the vertical leg 94. Generally, the crank knob 96 will be attached so as to rotate relative to the vertical leg 94. This example of the crank assembly 90 also provides leverage for use in thicker sauces. In another example the crank knob may be directly attached to the horizontal leg 92. In yet another example the crank knob is directly attached to the protrusion surface 88, and thus can rotate the paddles 68/70 by rotation of the crank knob without the leverage provided by the horizontal leg 92.

Figure 8:
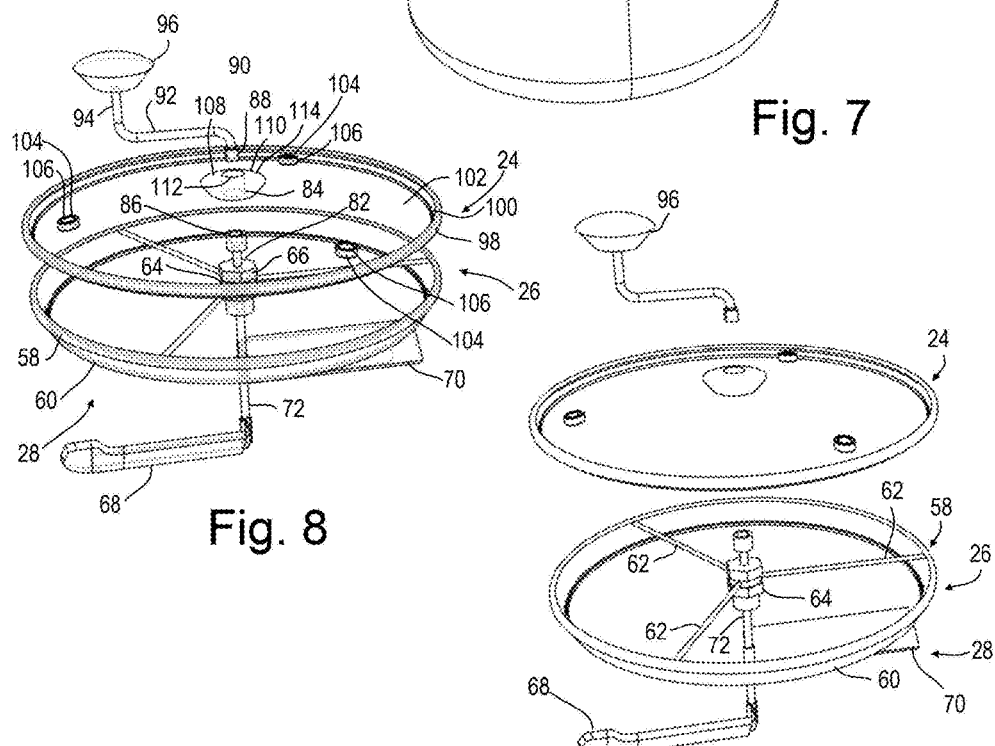
FIG. 8 is a disassembled hidden line view of the example shown in FIG. 1.

The exploded view of FIG. 8 also shows the lid assembly 24 which in this example includes a lid rim 98 including a downward protrusion 100 such that the lid rim 98 rests upon the frame rim 58 and the downward protrusion 100 extends therein so as to center, align, and maintain position of the lid assembly 24 relative to the frame assembly 26. As shown, the lid rim 98 surrounds a cover 102. The cover 102 substantially holds heat, liquids, and gases within the container 30 thus substantially forming a closed container. In the example shown, the cover 102 has a plurality of surfaces defining vents 104 through the cover 102 to allow some steam, pressure, heat, and gases to escape, thus avoiding a pressure buildup within the container 30 when the cover 102 is in place. As shown, each of the vents 104 has a vent ring 106 surrounding the associated vent 104. Commonly, the cover 102 is formed of glass or other polymers which is susceptible to breakage or damage and thus, the vent rings 106 are provided in part to reinforce the weak points formed by the vents 104.

In addition, the lid assembly 24 of this example includes a lifting knob 108 attached to the lid assembly 24 and comprising an outer surface 110 which in this example is angled outward from the lower portion 112 to the upper portion 114 such that a user may easily grasp the lifting knob 108 and then lift the lid assembly 24 free of the frame assembly 26 to allow access to the interior of the container 30. This allows the user to check the temperature, consistency, or taste, of the sauce without removing the frame assembly 26.

As it will often be desired to remove the frame assembly 90 with the lid assembly 24; the lifting knob 108 of this example has a surface defining a void 112 there through so as to allow passage of the crank receiver 84 in such a way that as the lid assembly 24 is removed from the frame assembly 26, the crank assembly 90 may be removed therewith. Alternatively, the crank assembly 90 may be removed independent of the lid assembly 24. In one example, this arrangement allows the crank assembly 90 and mixing assembly 28 of the cooking device 20 to be operated even without the lid assembly 24 in place for use as an open pot stirring apparatus.

Figure 2:
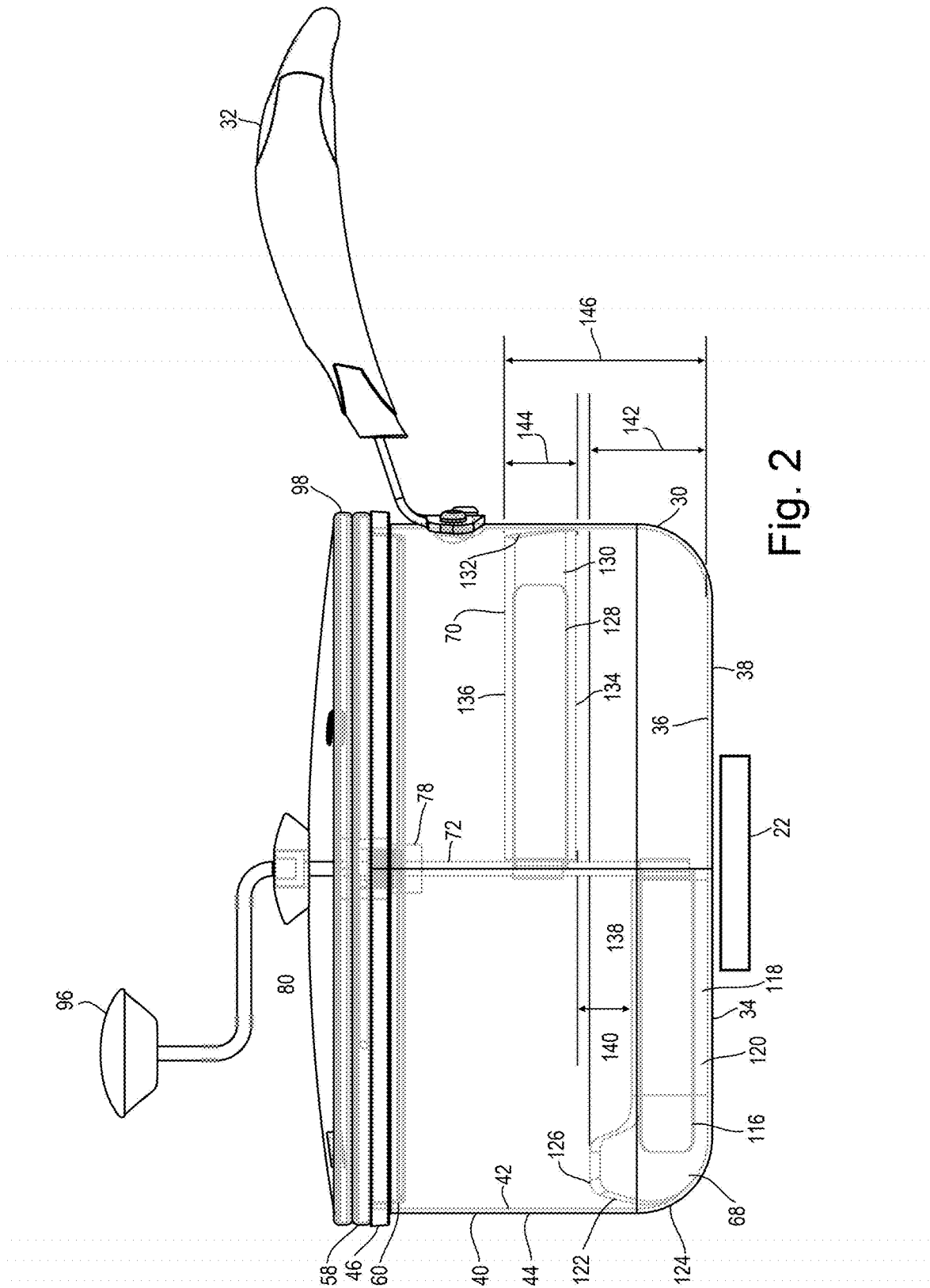
FIG. 2 is a side hidden line view of the example shown in FIG. 1 with the opposing side view being a mirror image thereof.
Figure 3:
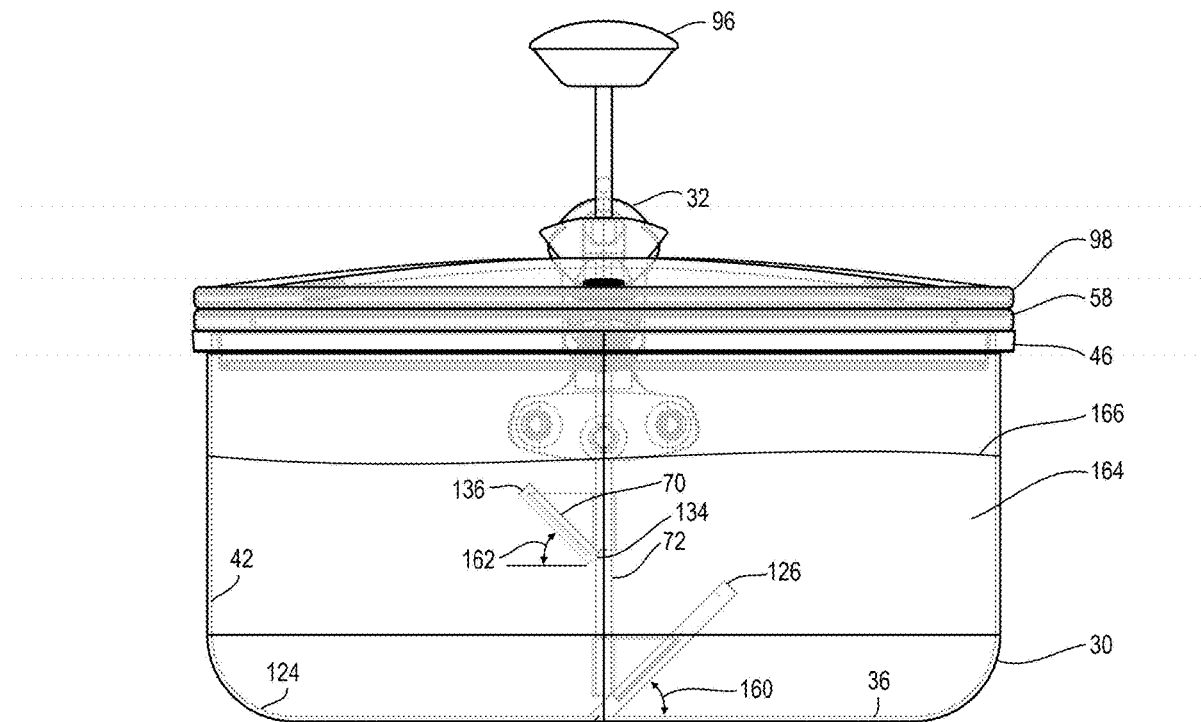
FIG. 3 is a front hidden line view of the example shown in FIG. 1.

The example shown in FIG. 2 also shows the scraper paddle 68 formed with a scraper paddle rigid core 116 which may be made of metals, alloys, plastics, or other rigid materials. Each scraper paddle 68 may further have a flexible or malleable scraper paddle coating 118 or cover affixed thereto wherein the lower edge 120 of the scraper paddle 68 contacts and scrapes against the inner surface 36 of the container 30 from the shaft 72 to the inner surface 42 of the sidewall 40. The scraper paddle coating 118 may comprise rubber, silicone, or other flexible/malleable materials. In addition, the radially outward edge 122 of the scraper paddle 68 contacts and scrapes against a transition area 124 connecting the inner surface 36 and the inner surface 42, and furthermore, the radially outward edge 122 of the scraper paddle 68 contacts and scrapes against the inner surface 42 of the sidewall 40 up to a top edge 126. In this Fig., it appears that there is a separation between these components however, when looking to FIG. 1; this contact of the radially outer edge 122 of the scraper paddle 68 to the inner surface 42 of the sidewall 40 can be seen more clearly relative to the angle of the scraper paddle 68 to the base 34 and sidewalls 40.

Figure 4:
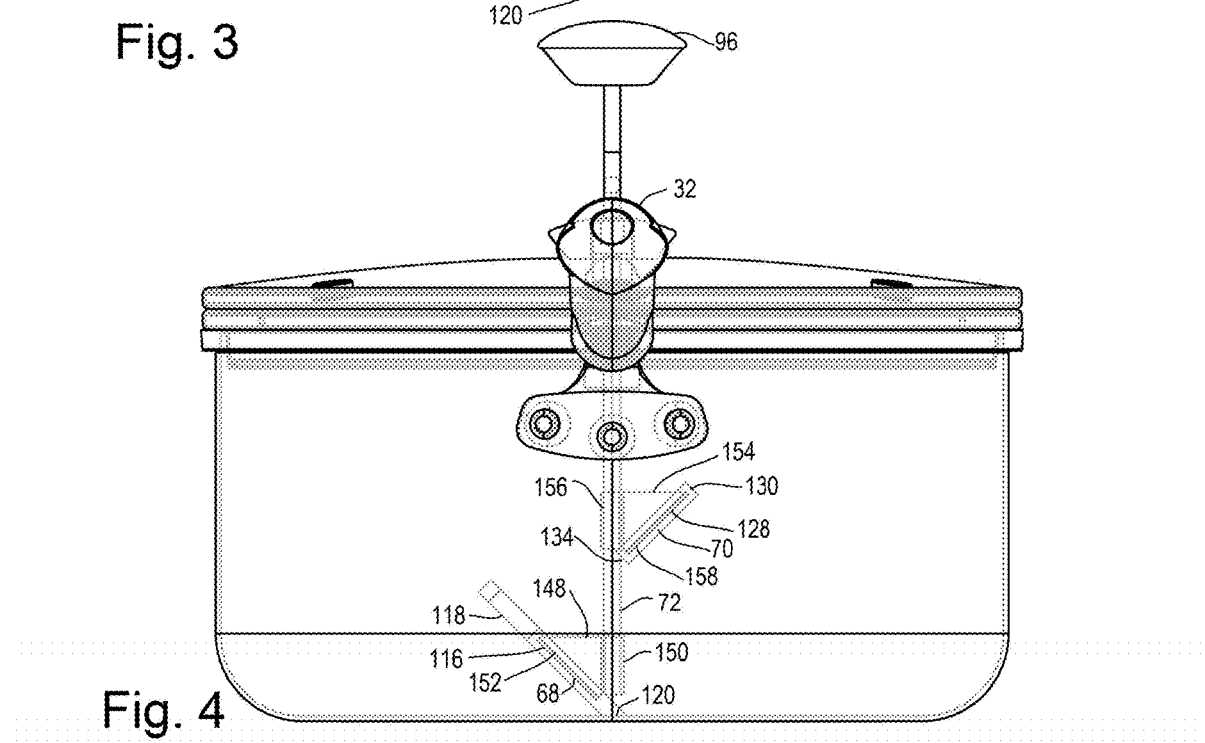
FIG. 4 is a rear hidden line view of the example shown in FIG. 1.

In addition to the scraper paddle 68, the mixer paddle 70 is provided to further mix, agitate, and scrape sauce from the inner surface 42 of the sidewalls 40 of the container 30 during cooking. In the example shown, the mixer paddle 70 comprises a mixer paddle rigid core 128 which may be made of metals, alloys, plastics, or other rigid materials. The mixer paddle 70 may also comprise a mixer paddle coating 130 substantially covering the rigid core 128 which may comprise rubber, silicone, or other flexible/malleable materials. In this example, the radially outward edge 132 of the mixer paddle 70 contacts and scrapes against the inner surface 42 of the sidewall 40 from a lower edge 134 of the mixer paddle 70 to an upper edge 136. In the example shown, it may be desired to have the lower edge 134 of the mixer paddle 70 at substantially the same vertical height as the top edge 126 of the scraper paddle 68 so as to provide a substantially complete scraping action of the surfaces of the container 30 which are most susceptible to scorching of the sauce. These surfaces encompass a first vertical region having a scraper paddle scraping height 142 and a mixer paddle scraping height 144 combined to form an overall scraping height 146. In one example, the overall scraping height 146 is more than one half of the vertical distance between the base 34 and the container rim 46. As sauces are generally not cooked in volumes substantially exceeding one half the volume of the container 30 it is expected that the overall scraping height 146 need not substantially extend upwards to the container rim 46. For example in FIG. 4 where the volume of sauce 164 has an upper surface 166 below the container rim 46 and above the mixing paddle 70.

In the example shown in FIG. 2, the scraper paddle 68 comprises a median edge 138 which lies in a plane which is vertically above the lower edge 120. It is also shown in this example that the median edge 138 lies in a plane vertically below the top edge 126 in FIG. 4 and in FIG. 5 it can be seen that these edges 138/120 are not directly vertically aligned. This example of the scraper paddle 68 having a median edge 138 having a vertical paddle offset 140 to the lower edge 134 of the mixer paddle further enhances mixing of the sauce during cooking. The scraper paddle 68 and mixer paddle 70 of this example are not only circumferentially offset by substantially 180° as can be seen in the top view of FIG. 5, they are also vertically offset 140 which allows more space for the sauce to lift and mix during rotation of the mixer assembly 28.

Although only a single scraper paddle 68 and single mixer paddle 70 are shown, it is to be appreciated that multiple embodiments of each of these paddles 68/70 may be incorporated into a single device. In one example, multiple mixer paddles 70 may be provided at varying vertical and/or circumferential positions about the shaft 72.

Figure 5:
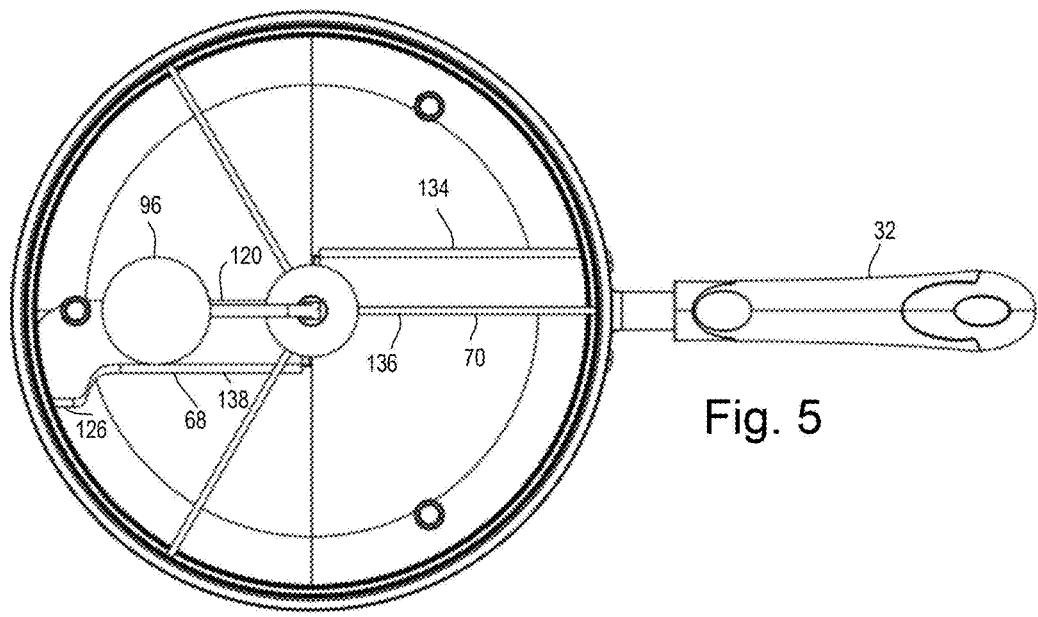
FIG. 5 is a top view of the example shown in FIG. 1.
Figure 6:
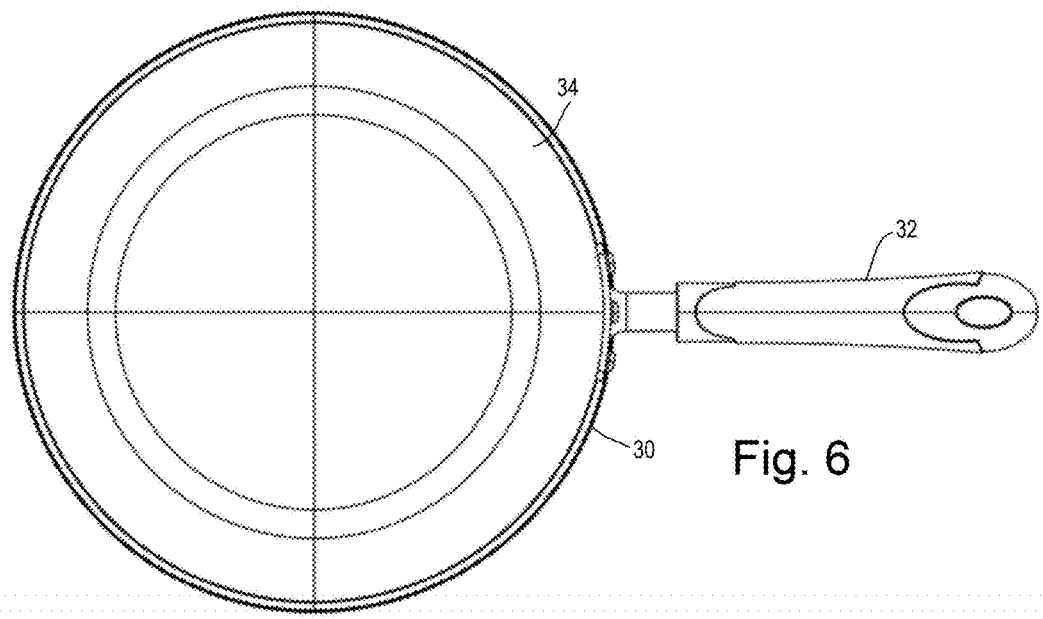
FIG. 6 is a bottom view of the example shown in FIG. 1.
Figure 7:
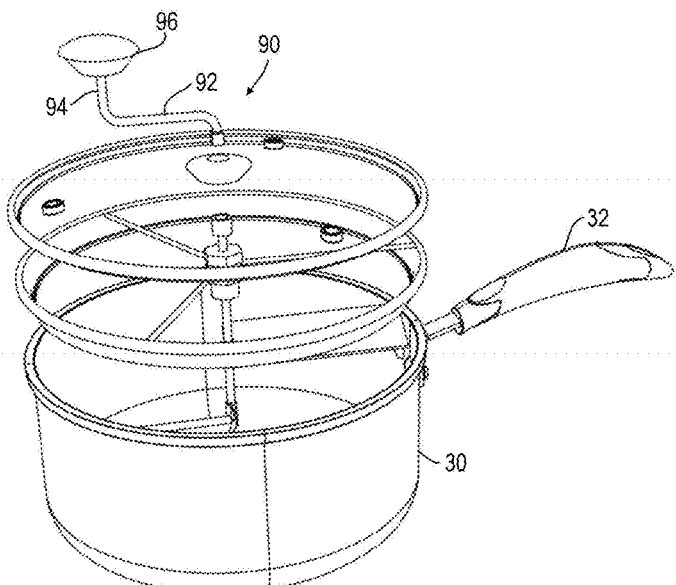
FIG. 7 is a partially disassembled view of the example shown in FIG. 1.

Looking to FIG. 5 is shown an example wherein the lower edge 120 of the scraper paddle 68 is radially aligned with the shaft 72 and extends radially outward therefrom. To accomplish this, in the example shown an angled flange 148 may be provided having a first side 150 attached to the shaft 72 and a second side 152 attached to the scraper paddle 68. In one example, the angled flange 148 is formed as an integral component of the scraper paddle rigid core 116 by bending, casting, welding, or other methods.

FIG. 5 also shows the mixer paddle 70 formed in a similar manner, wherein the lower edge 134 of the mixer paddle 70 is radially aligned with and extends radially outward from the shaft 72. To accomplish this, another angled flange 154 is provided having a first side 156 attached to the shaft 72 and a second side 158 attached to the mixer paddle 72. As with the angled flange 148, the angled flange 154 may be formed as an integral component of the mixer paddle rigid core 128 by bending, casting, welding, or other methods.

Each of the scraper paddle 68 and mixer paddle 70 are angled 160 and 162 relative to the base 34. These angles may be between 30° and 60°, and in a narrower range between 40° and 50° to maximize mixing, stirring, and/or scraping of the sauce from the inner surfaces of the container up to an upper surface 166 of the sauce 160.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A cooking device comprising:
    a container having a base with an interior surface, at least one sidewall, and a container rim at the upper vertical edge of the sidewall;
    a lid assembly removably attached to the container, a mixer assembly removably attached to the lid assembly, a shaft assembly, and a crank assembly;
    the frame assembly comprising a frame rim attached to the container;
    the frame assembly comprising a radially central frame hub;
    the shaft assembly comprising a shaft extending from the frame hub downward toward the base of the container, the shaft having a vertical axis of rotation;
    the shaft assembly further comprising a scraper paddle extending from the shaft in a first horizontal direction so as to rotate therewith,
    the scraper paddle in constant contact with the interior surface of the base of the container from the axis of rotation of the shaft to the sidewall of the container;
    the shaft assembly further comprising a mixer paddle extending from the shaft in a second horizontal direction and configured to rotate there with;
    the mixer paddle in a horizontal plane above the scraper paddle;
    the lid assembly substantially extends across the container rim enclosing the container; and
    wherein the crank assembly is removably attached to the shaft and extends vertically above the frame assembly.

2. The cooking device as recited in claim 1 wherein the frame is removably attached to the container rim.

3. The cooking device as recited in claim 1 wherein the lid assembly is removably attached to the frame rim.

4. The cooking device as recited in claim 1 wherein the scraper paddle comprises a rigid core and a malleable outer layer.

5. The cooking device as recited in claim 4 wherein the malleable outer layer comprises heat resistant silicone.

6. The cooking device as recited in claim 4 wherein the rigid core comprises metal.

7. The cooking device as recited in claim 1 wherein the mixer paddle comprises a rigid core and a malleable outer layer.

8. The cooking device as recited in claim 7 wherein the malleable outer layer comprises heat resistant silicone.

9. The cooking device as recited in claim 7 wherein the rigid core comprises metal.

10. The cooking device as recited in claim 1 wherein the mixer paddle is at an angle of less than 90° to the interior surface of the base.

11. The cooking device as recited in claim 1 the scraper paddle at an angle of less than 90° to the interior surface of the base.

12. The cooking device as recited in claim 1 wherein the crank assembly comprises a horizontal leg extending horizontally from the axis of rotation of the shaft to provide leverage, and a knob rotatably attached to the horizontal leg.

13. The cooking device as recited in claim 1 wherein the crank assembly is coupled to the lid assembly to be removed therewith.

14. The cooking device as recited in claim 1 wherein the lid assembly comprises surfaces defining a plurality of vent holes through the lid assembly.

15. The cooking device as recited in claim 14 further comprising a vent ring attached to the lid assembly surrounding and reinforcing each vent hole.

16. The cooking device as recited in claim 1 wherein the lid assembly comprises:
a lifting knob attached to the lid assembly;
the lifting knob having a surface defining a void there through aligned with the axis of rotation of the shaft; and
the crank assembly removably attached to the shaft assembly at the lifting knob.

17. The cooking device as recited in claim 1 wherein the scraper paddle has a lower edge radially aligned with the shaft, wherein the lower edge extends radially outward toward an inner surface of the sidewall.

18. The cooking device as recited in claim 1 wherein the mixer paddle has a lower edge radially aligned with the shaft, wherein the lower edge extends radially outward toward an inner surface of the sidewall.

19. A cooking device comprising:
a container having a base, at least one sidewall, and a container rim at the upper vertical edge of the sidewall;
a lowermost inner surface of the base having a substantially planar inner surface;
a mixer assembly comprising: a frame assembly removably attached to the container, a lid assembly removably attached to the container rim, and a crank assembly removably attached to the frame assembly;
the frame assembly comprising a frame rim attached to the container rim and a radially central frame hub;
a shaft assembly comprising a shaft extending from the frame hub downward toward the lowermost inner surface of the base, the shaft having a vertical axis of rotation orthogonal to the base of the container;
the shaft assembly further comprising a paddle extending from the shaft in a first horizontal direction so as to rotate therewith,
the lid assembly substantially extends over the container rim enclosing the container; and
the crank assembly is removably attached to the shaft independent of the lid assembly, wherein the crank assembly extends vertically above the frame assembly.

\* \* \* \* \*